Figure 1:
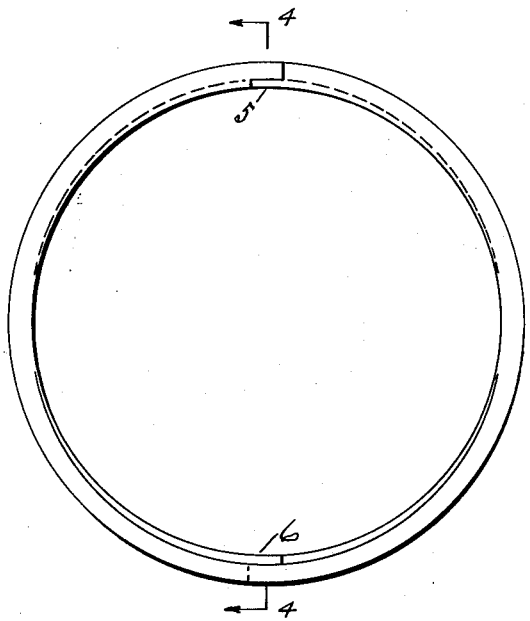

Aug. 19, 1952 — L. M. WESTERHOUSE — 2,607,645
INTERLOCKING PISTON RING COMPRISING
TWO SUBSTANTIALLY IDENTICAL PARTS
Filed June 6, 1949

Inventor
Louis M. Westerhouse
By Chas. Denegre
Attorney

Patented Aug. 19, 1952

2,607,645

UNITED STATES PATENT OFFICE 2,607,645

INTERLOCKING PISTON RING COMPRISING TWO SUBSTANTIALLY IDENTICAL PARTS

Louis M. Westerhouse, Birmingham, Ala.

Application June 6, 1949, Serial No. 97,364

1 Claim. (Cl. 309—46)

This invention relates to an interlocking piston ring comprising two parts that are substantially identical. The advantages are that it has leakproof joints to the extent that an increase in the opening does not increase the chance for leakage and would not be so close as to interfere with the lubrication. Another advantage is in the structure, the ring being double the joints will remain staggered. A further advantage is that each half may be manufactured off the same piece they being exactly alike except for the lap in the joint, the cutting of which may be straight or diagonal or any other type of lap joint with good results. Still further advantages are: joints may be cut so that any two halves will fit together; also the hook feature under the joints which in addition to keeping the joints staggered prevent the ends of the rings at the joints from being out of line with the bore of the cylinder due to the snap in the ring and which also prevents these ends from catching in the parts when used as a floating valve ring on steam engines and on two cycle internal combustion motors or any place where the ring must travel over openings in the cylinder. Also the feature of having the back of one half section of the ring adapted to hold the ends of the opposite half in place will be an important advantage when using the ring in internal combustion motors or on any type of compressor where high speed and good compression are required.

Other objects and advantages will appear from the drawing and description.

Figures 2, 3:
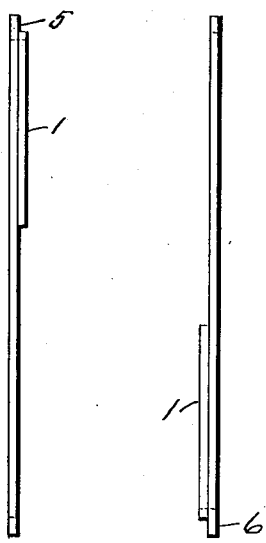
Figure 4:
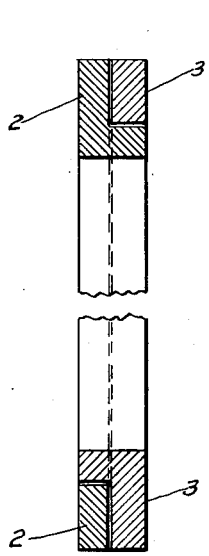
Figure 5:
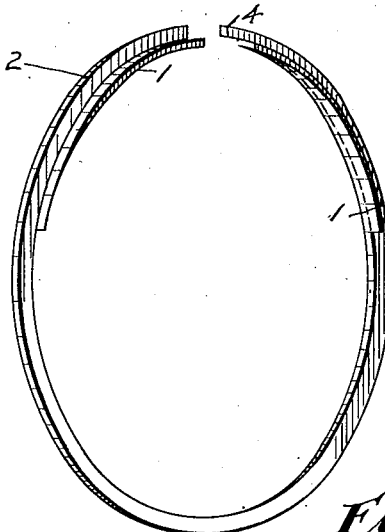

By referring generally to the drawing, part of this application, it will be observed that Fig. 1 is a plan view of the assembled ring; Figs. 2 and 3 are edge views of the two halves of the ring as shown in Fig. 1; Fig. 4 is an enlarged sectional view on line 4—4 of Fig. 1 showing in detail the lap of the joints; and Fig. 5 is an enlarged perspective view of one half of the ring, the other half not shown enlarged being substantially identical.

Similar reference numerals refer to similar parts throughout the several views.

Referring to the drawing in detail it will be seen that the ring comprises two parts 2 and 3 with each having integral projection guide portions 1 adapted to better retain the assembled ring in its regular position for use in the groove of a piston. The lap portions 4 are identical except that in one half it points left and in the other half right as indicated by 5 and 6.

The ring parts may be made of any material suitable for the purpose, but I prefer to use the kind of metals generally used in the manufacture of piston rings. Also the rings may be made in various sizes and capacities.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

In a piston ring having two substantially similar parts of the character described comprising: two parts made of metal, each ring part having its inner circumference excentric with its outer circumference thus forming a thin wall on one side of the part and a thick wall on the opposite side of the part, a lapping-type joint in the thick portion, an integral projection portion on each side of the joint in the thick wall portion and extending around some distance from the joint and being equal in thickness to the main body portion of one part, each projection portion having its outside arch with a radius equal to the radius of the inside circumference and being equally off center with the radius of the outside circumference as is the inside circumference but otherwise being off center in the opposite direction from that of the inside circumference of the ring, said ring parts being adapted to mesh with each other when the projections on each part are overlapped by the thin wall portion and being assembled in a piston ring groove in a piston.

LOUIS M. WESTERHOUSE.

REFERENCES CITED

The following references are of record in the file of this patent:

UNITED STATES PATENTS

| Number | Name | Date |
|---|---|---|
| 1,106,462 | Kytlica | Aug. 11, 1914 |
| 1,309,609 | Bryant | July 15, 1919 |
| 1,357,949 | Brooks | Nov. 9, 1920 |
| 1,374,852 | Ingram | Apr. 12, 1921 |
| 1,391,845 | Moratta | Sept. 27, 1921 |
| 2,047,590 | Madsen | July 14, 1936 |

FOREIGN PATENTS

| Number | Country | Date |
|---|---|---|
| 129,193 | Great Britain | July 10, 1919 |
| 327,208 | Great Britain | of 1930 |